March 13, 1945.  H. B. ROGERS  2,371,468

METHOD AND APPARATUS FOR CONDITIONING AIR

Filed June 25, 1940

Inventor
Horace B. Rogers
Munn, Anderson & Liddy
Attorneys

Patented Mar. 13, 1945

2,371,468

UNITED STATES PATENT OFFICE 2,371,468

METHOD AND APPARATUS FOR CONDITIONING AIR

Horace B. Rogers, Norfolk, Va.

Application June 25, 1940, Serial No. 342,355

6 Claims. (Cl. 98—2)

This invention relates to a method and apparatus for conditioning air in an automobile.

An object of the invention is the provision of a device which is adapted to be applied to an automobile for creating a screen in the form of a mist around the ventilating openings or windows at one side of an automobile in such a manner that air is drawn into the automobile through the film of water at a rear opening in the side of the automobile and after circulation through the interior of the automobile the air is sucked out of a front opening at said side, the air receiving a predetermined quantity of moisture while being filtered of any dust, bacteria or other foreign matter.

Another object of the invention is the provision of a device for applying fine streams of water at one outer edge of the front of the automobile beyond one edge of the windshield so that when the automobile is traveling at twenty-five miles or more the streams of water will be impinged on said outer edge and thereby create a screen around one side of the vehicle and around a pair of spaced openings in said side of the automobile so that any air passing through the openings in said side of the automobile must pass through the screen formed of water mist, the water which is sprayed on the edges of the automobile at each side of the windshield forming a seal at this point to prevent air or foreign matter from passing through the water at these points and into the openings in the automobile.

A further object of the invention is the provision of a device for forming a screen of diffused water where ventilating openings at one side of an automobile have been provided for the circulation of air through the interior of the automobile, the other side of the automobile being closed and being free of the vapor screen, the water being so projected onto the front of the automobile that when the automobile is traveling at approximately twenty-five miles or more the fine streams of water will strike the extreme outer edge of the front at one side of the windshield and the water will be broken up into extremely fine particles and then be carried outwardly away from the side and bowed inwardly toward the rear end of the automobile, the water passing the openings in spaced relation with said openings in the side of the automobile where the screen or film of water is provided permitting the circulation of air through the automobile, a drop in atmospheric pressure taking place at the opening in the side of the automobile near the windshield while suction is being created at a ventilating opening near the rear end of the automobile, the screen removing particles of dust, bacteria and other foreign matter from the air in passing through the screen.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

Figure 1:
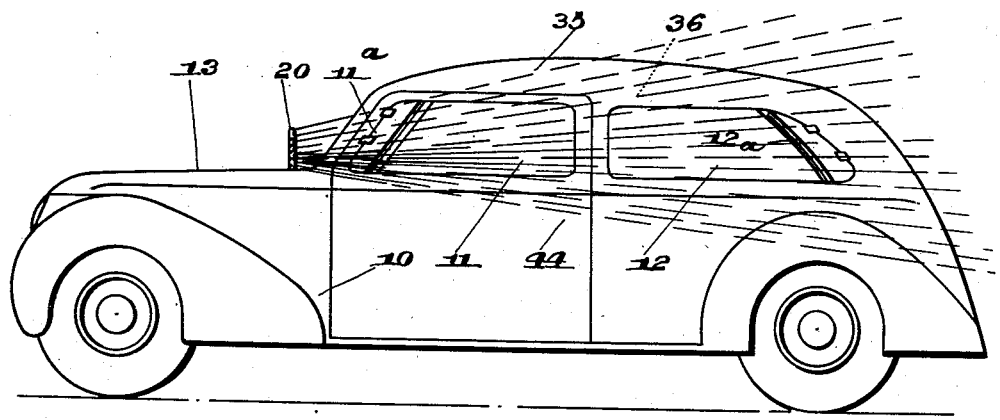
Figure 1 is a side elevation of an automobile showing my invention applied thereto.

Referring more particularly to the drawing, 10 designates the body of an automobile having side windows 11 and 12 which may be lowered to produce ventilation in the car as shown more particularly in Figure 1. Auxiliary windows 11ᵃ and 12ᵃ are hinged to the body and when opened provide vents at an edge of each window. The automobile is provided with the usual hood 13, a dash 14 and a windshield 15.

A pair of spraying nozzles 20 and 21 extend upwardly through the hood 13 and are provided with a plurality of perforations 22 for spraying water rearwardly so that the fine sprays of water will just contact the outer edge 23 of the front of the automobile and just beyond the windshield 15 when the automobile is traveling at approximately twenty-five miles an hour or more. However, when the automobile is traveling at a slow speed or less than twenty-five miles the spray will tend to pass beyond the side edges and outwardly beyond the sides of the automobile without contacting the side edge 23.

The perforated pipes 20 and 21 are connected with a common supply pipe 24 and this pipe is supplied with water from a pump 25 which draws water through a pipe 26 from the supply tank 27. Valves 28 and 29 are located respectively in the perforated pipes 20 and 21 and are operated by respective rods 30 and 31 which extend through the dash 14 and terminate in knobs 32 and 33 respectively which may be used for manually operating the rods 30 and 31 and likewise the valves 28 and 29.

The pump 25 may be located beneath the hood and may be operated directly from the engine 13 or one of the moving parts of the engine, or the pump may be operated by an electric motor 34 connected with the source of current from the automobile.

The supply tank is shown as being carried at the bottom of the car, although this supply tank may be built in the top 35 of the automobile or there may be a double source of supply, one tank being located at the bottom as indicated at 27, the other tank being located in the top as shown in dotted lines in Figure 1 and indicated at 36. When a tank is located at the top, water will be supplied through a pipe 37 to the pipe 26. A valve 38 is employed for cutting off the tank 36 to the pipe 26 while water is being drawn from the tank 27. A valve 39 cuts off tank 27.

While I have shown that the windows 11 and 12 at either side of the automobile may be employed for ventilating purposes, nevertheless, special ventilators 11a and 12a are built into the automobile at each side adjacent the front and back portion of the automobile by eliminating portions of the windows 11 and 12 so that the member 11a may be opened with its free edge pointing rearwardly while the rear ventilator will point forwardly. The rear ventilator 12a causes the air to be forced into the automobile while air passing over the open ventilator 11a will create a suction.

Figure 2:
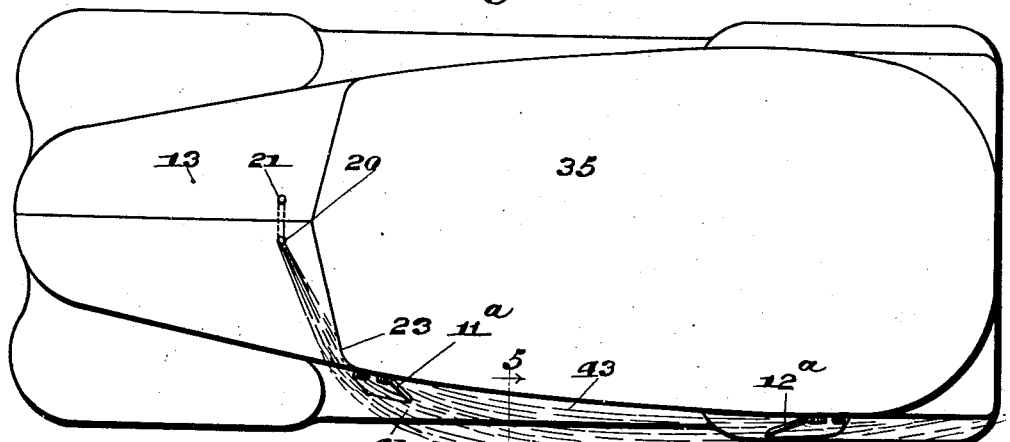
Figure 2 is a plan view of the automobile showing a vapor screen formed at one side of the automobile.
Figure 3:
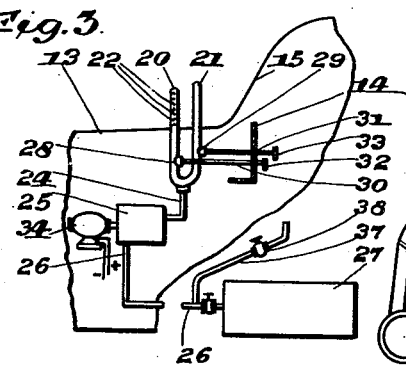
Figure 3 is a fragmentary side view of an automobile showing the apparatus for supplying the water to create the screen.
Figure 4:
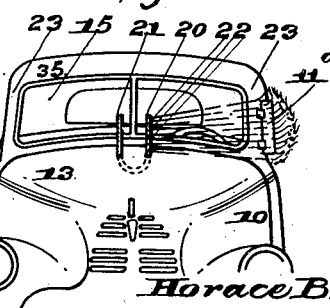
Figure 4 is a fragmentary front view of the automobile showing the invention applied thereto.
Figure 5:
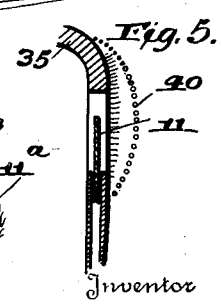
Figure 5 is a fragmentary vertical section taken along the line 5—5 of Figure 2.

When it is desired to provide a screen of diffused water entirely around a pair of openings formed by the movable ventilators 11a and 12a at one side of the automobile the rod 30 is adapted to open the valve to the pipe 20 so that when the pump has been started water under a predetermined pressure will be forced through the perforations 22 in the pipe 20 and this water is sprayed towards the side edge of the front portion of the automobile at one side of the windshield. In other words, the water as shown in Figure 4, is sprayed rearwardly towards the curved edge 23 of the front of the automobile and when the automobile is traveling at approximately twenty-five miles or more the fine sprays of water are forced against the edge 23 where it comes in contact with the same and this water is broken up into extremely fine particles and is carried rearwardly beyond the edge as shown in Figures 1 and 2.

As the water passes over the edge 23 it forms a seal with a continuous sheet of water all along the edge, and this sheet seals the edge against air at this point from entering the space located between one side of the automobile and the outer portion 40 of the screen. In other words, when the water passes beyond the edge 23 the dispersed water is bowed outwardly and rearwardly as shown at 41 and then after it passes the central portion of the automobile it is then bowed inwardly and rearwardly as shown at 42 and comes in contact with the rear side portion of the automobile. The lighter portion of the screen, as indicated at 43 in Fig. 2, is curved inwardly and contacts the top side edge of the automobile. The bottom portions, as indicated at 44 in Figure 1, are also bowed inwardly so that the dispersed water forms a screen entirely around the windows 11 and 12 and any air entering the interior of the automobile must pass through this screen of water.

Due to the fact that the air and the water rushes past the ventilator 11a, the atmospheric pressure falls slightly adjacent said window, while humid air is directed by the ventilator 12a into the vehicle. Thus the air will be driven through the rear opening into the interior of the automobile and the air after circulating through the interior of the automobile will be sucked out through an opening at the ventilator 11a.

As has been previously stated, the air cannot break through the seal at the shoulder 23 of the automobile at one side of the windshield, but is drawn through the thin film or sheet of water along the side of the automobile and into the rear opening, and as the air passes through the film, all dust particles are removed, while at the same time it takes up a predetermined quantity of moisture so that the air entering the interior of the automobile through the rear opening will be sufficiently humidified to create greater comfort for the occupants of the automobile.

Furthermore, not only is dust and foreign matter eliminated from the air, but the screen of water will also filter from the air germs which would ordinarily pass into the automobile.

As has been stated, water is forced through fine perforations in the pipes or nozzles 20 and 21 and is highly diffused by the time it reaches the slip stream corners 23 at the front of the automobile where the water acts as a seal against unwashed air. As the diffused water passes beyond the corner post it moves outwardly from the automobile and rearwardly of the side thereof to form a screen of moist air which covers substantially the entire vent side of the car. Through this highly diffused screen of fresh water air is constantly drawn into the car through an opening in the side of the car which may be formed by lowering the window or by a built-in ventilator 12a and after passing through the car the air is entrained at the ventilator on the same side of the car.

The intake and discharge openings should have equal capacity so that there will be a constant circulation of the air in the car at speeds of twenty-five miles or more. The windows or ventilators at the other side of the car, however, should be closed.

Before starting the device in operation in summer, or when the temperature is above forty degrees F., all windows and vents should be closed, after which the forward and rear ventilators at one side of the car should be opened to the fullest extent. The pump is electrically operated by a switch on the steering column and the valve which controls the spray of water at that side of the car should then be opened.

It has been found by actual experience that persons riding in the car so equipped have found relief from colds due to the fact that the air is thoroughly washed of all dust particles thus eliminating the breathing in of irritating substances while the air has been supplied with sufficient moisture which will have a soothing effect upon the irritated membranes of the nasal and bronchial passages.

As has been explained, either side of the car may be employed for washing the air and in that event the openings at that side of the car are opened while the ventilating openings at the opposite side of the car are closed.

Due to wind pressure on the sprays, the water becomes diffused and slips past the corner post in a thin sheet of mist. While some of the mist comes into contact with the post the water is not broken up by such action.

I claim:

1. A device for conditioning air entering an opening on one side of a moving automobile comprising a pair of pipes projecting upwardly from the hood of the automobile and provided with a plurality of spaced perforations, means supplying water under pressure to the pipes, said pipes being spaced from the front of the windshield of the automobile, the perforations in the pipes being so positioned that streams of water issuing therefrom will strike the side edges of the front of the body of the moving automobile beyond the side edges of the windshield and be merged into a thin sheet of mist which will form a screen in spaced relation with one side of the automobile, and means cutting off the water to either pipe.

2. A device for conditioning air entering an opening in one side of a moving automobile comprising a pipe projecting upwardly from the hood of an automobile and provided with a plurality of spaced nozzles, means supplying water under pressure to the pipe, said pipe being located forwardly of the windshield of the automobile, said nozzles being positioned to direct streams of water against a corner post of the automobile beyond a side edge of the windshield so that the streams will be merged into a thin sheet as they slip off the post beyond which the water forming a screen of mist spaced from the side of the automobile, the upper and rear portion of the screen bending inwardly and contacting with the upper and rear portions of the automobile.

3. In a traveling automobile having a pair of closable openings in one side of the automobile, a device for conditioning air entering one of said openings comprising a pipe projecting through the hood of the automobile and located forwardly of the windshield, means supplying the pipe with water under pressure, a plurality of spaced nozzles in the pipe for projecting streams of water towards the front corner posts so that when the automobile is traveling at the rate of twenty-five miles or more the streams will be sent against the outer edges of the post and be projected around the outer edges of the post to form a thin sheet of dispersed water particles which substantially encloses in spaced relation, the openings in the side of the car.

4. A device for conditioning air entering an opening in one side of a moving automobile, comprising a pipe positioned above the hood and forwardly of the windshield of said automobile, said pipe having spray orifices therein positioned to direct diffused streams of water laterally of the automobile windshield and beyond the corner post of the automobile at that side of the automobile in which the opening is located, and means for supplying water under pressure to said pipe, the diffused streams of water as they pass beyond said corner post being forced rearwardly of the automobile along the side thereof in which said opening is located by the air stream created along said side by the movement of the vehicle along the highway, whereby a thin sheet of mist is formed along said side and across said opening.

5. A device as defined in claim 4 in which the means for supplying water under pressure to the pipe is operated from the engine of the automobile, whereby the pressure of the water supplied to said pipe is proportional to the speed of the engine.

6. Means for circulating conditioned air through the body portion of a moving automobile, comprising an automobile body including a windshield at the front thereof and having spaced openings adjacent the front and rear portions at one side of said body, a pipe positioned above the hood and forwardly of the windshield of said automobile and having spray orifices positioned to direct diffused streams of water laterally of said windshield and beyond the corner post of said body at that side of the body in which the openings are located, and means for supplying water under pressure to said pipe, the diffused streams of water passing laterally beyond said corner post being forced rearwardly of said body and along the side thereof in which said openings are located, and past the spaced front and rear openings in said body, whereby a thin sheet of mist is formed and is forced along said side and across said openings, air passing through the thin sheet of mist and into said rear opening being discharged through said front opening to cause circulation of conditioned air through said body from the rear to the front openings therein.

HORACE B. ROGERS.